United States Patent
Misaki et al.

(10) Patent No.: US 7,878,571 B2
(45) Date of Patent: Feb. 1, 2011

(54) WINDSHIELD DEVICE FOR MOTORCYCLE

(75) Inventors: Kenichi Misaki, Saitama (JP); Takefumi Okubo, Saitama (JP); Hiroshi Tatsumi, Saitama (JP); Kenji Tako, Saitama (JP); Kanji Hayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 12/328,645

(22) Filed: Dec. 4, 2008

(65) Prior Publication Data

US 2009/0189413 A1 Jul. 30, 2009

(30) Foreign Application Priority Data

Jan. 25, 2008 (JP) ............................. 2008-015532

(51) Int. Cl.
*B62J 17/04* (2006.01)
(52) U.S. Cl. .................................. 296/78.1; 296/180.5
(58) Field of Classification Search ............. 296/180.5, 296/78.1; 454/122
See application file for complete search history.

(56) References Cited

U.S. PATENT DOCUMENTS

| | | | | |
|---|---|---|---|---|
| 4,615,556 A | * | 10/1986 | Stahel | 296/78.1 |
| 6,293,606 B1 | * | 9/2001 | Jarosz et al. | 296/78.1 |
| 6,709,042 B2 | * | 3/2004 | Takemura et al. | 296/78.1 |
| 6,979,039 B2 | * | 12/2005 | Takemura et al. | 296/78.1 |
| 7,357,438 B2 | * | 4/2008 | Yamasaki | 296/78.1 |
| 7,387,328 B2 | * | 6/2008 | Willey | 296/78.1 |
| 7,552,960 B2 | * | 6/2009 | Yoshitake et al. | 296/78.1 |
| 7,686,369 B2 | * | 3/2010 | Matsuo et al. | 296/78.1 |
| 7,703,831 B2 | * | 4/2010 | Matsuo et al. | 296/91 |
| 7,722,108 B2 | * | 5/2010 | Ueda et al. | 296/78.1 |
| 2008/0236922 A1 | * | 10/2008 | Tsuda | 180/167 |
| 2009/0021582 A1 | * | 1/2009 | Nakaya | 348/148 |
| 2009/0195011 A1 | * | 8/2009 | Tsuda et al. | 296/78.1 |

FOREIGN PATENT DOCUMENTS

| JP | 2967374 B2 | 8/1999 |
|---|---|---|
| JP | 3808346 B2 | 5/2006 |

* cited by examiner

*Primary Examiner*—Jason S Morrow
(74) *Attorney, Agent, or Firm*—Birch, Stewart, Kolasch & Birch, LLP

(57) ABSTRACT

A windshield device for a motorcycle includes a front cowl located at a front side of the vehicle body to cover a vehicle body; a windscreen disposed at an upper part of the front cowl so as to be vertically movable; an air introducing port for introduction of air from the front side being formed between a lower end of the windscreen and a front surface of the front cowl; and an air guide for guiding the air introduced through the air introducing port to flow rearwards along a rear surface of the windscreen, wherein the air guide is firmly attached to the rear surface of the windscreen.

15 Claims, 11 Drawing Sheets

WINDSHIELD DEVICE FOR MOTORCYCLE

CROSS-REFERENCE TO RELATED APPLICATIONS

This nonprovisional application claims priority under 35 U.S.C. §119(a) on Patent Application No. 2008-015532, filed in Japan on Jan. 25, 2008, the entirety of which is incorporated herein by reference.

BACKGROUND OF THE INVENTION

1. Field of the Invention

The present invention relates to a windshield device, and more particular, to a windshield device for a motorcycle, including a front cowl for covering a vehicle body on the front side, and a windscreen disposed at an upper part of the front cowl so as to be vertically movable, in which an air introducing port for guiding air coming from the front side is formed between a lower part of the windscreen and a front surface of the front cowl.

2. Background of the Invention

Such a windshield device for a motorcycle as above has already been known, as disclosed in Japanese Patent No. 3808346. In such a windshield device, the air introducing port is also moved vertically as the windscreen is moved. In the device disclosed in Japanese Patent No. 3808346., when the windscreen is moved to the upper side, that part of an upper part of the front cowl which overlaps with a lower part of the windscreen in the front view would become smaller, making it difficult to efficiently guide rearwards the air introduced from the front side through the air introducing port.

SUMMARY OF THE INVENTION

The present invention has been made in consideration of the above-mentioned circumstances. Accordingly, it is an object of the present invention to provide a windshield device for a motorcycle by which the flow of air introduced into an air introducing port can be controlled so that the air can efficiently be made to flow along a rear surface of a windscreen, irrespectively of the moved position of the windscreen.

In order to achieve the above object, in accordance with a first aspect of the present invention, a windshield device for a motorcycle, includes a front cowl for covering a vehicle body at the front side of the vehicle body, a windscreen disposed at an upper part of the front cowl and vertically movable, an air introducing port for introduction of air from the front side being formed between a lower part of the windscreen and a front surface of the front cowl, and an air guide for guiding the air introduced through the air introducing port to make the air flow rearwards along a rear surface of the windscreen, wherein the air guide is firmly attached to the rear surface of the windscreen.

In accordance with a second aspect of the present invention, the windscreen, the air guide, and at least that part of the front cowl which is below the windscreen are formed to be inclined rearwardly upwards.

In accordance with a third aspect of the present invention, a plurality of sub-screens for guiding the air on both lateral lower sides of the windscreen to make the air flow to the outside of the vehicle body when the windscreen is moved upwards are provided respectively on both sides of the front cowl along the width direction of the vehicle body and are located below the windscreen.

In accordance with the first aspect of the present invention, the air introduced from the front side into the air introducing port is guided by the air guide, which is firmly attached to the rear surface of the windscreen, so as to flow rearwards along the rear surface of the windscreen. Therefore, even when the position of the air introducing port is changed due to a movement of the windscreen, the flow of the air introduced into the air introducing port can be controlled so that the air can efficiently be made to flow along the rear surface of the windscreen.

In accordance with the second aspect of the present invention, the windscreen, the air guide, and at least that part of the front cowl which is below the windscreen are formed to be inclined rearwardly upwards. This makes it possible to efficiently introduce the air coming from the front side into the air introducing port, even when the windscreen is moved vertically.

In accordance with the third aspect of the present invention, the sub-screens for guiding the air on both lateral lower sides of the windscreen to make the air flow to the outside of the vehicle body when the windscreen is moved upwards are provided respectively on both sides of the front cowl along the width direction of the vehicle body and are located below the windscreen. Therefore, the air present below the windscreen and on both sides of the front cowl can be efficiently made to flow rearwards, regardless of vertical movements of the windscreen. Particularly, when the windscreen is moved into an uppermost position, the air on both sides of the front cowl can be efficiently made to flow rearwards by the sub-screens.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
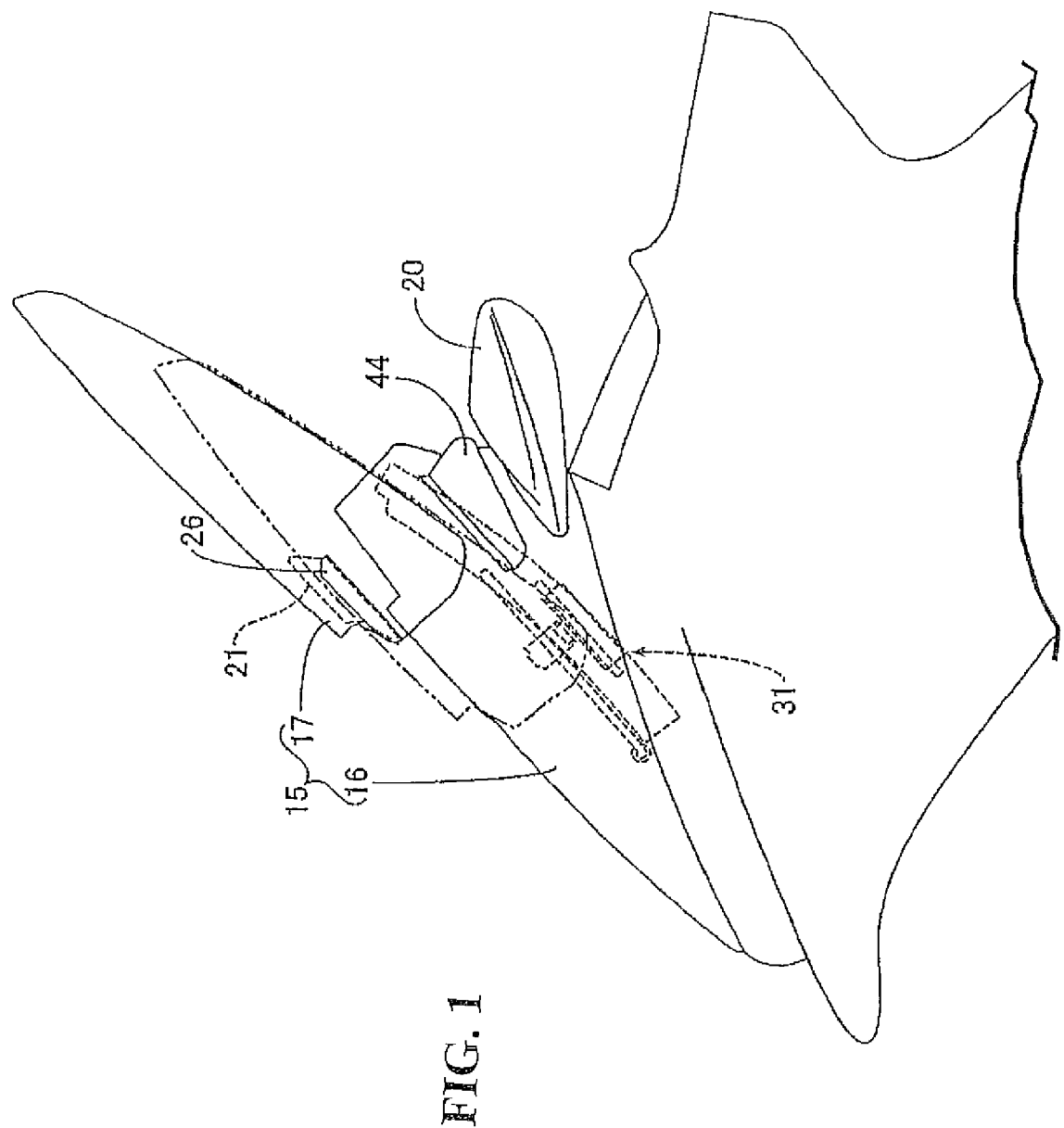
FIG. 1 is a front part side view of a motorcycle in accordance with an embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
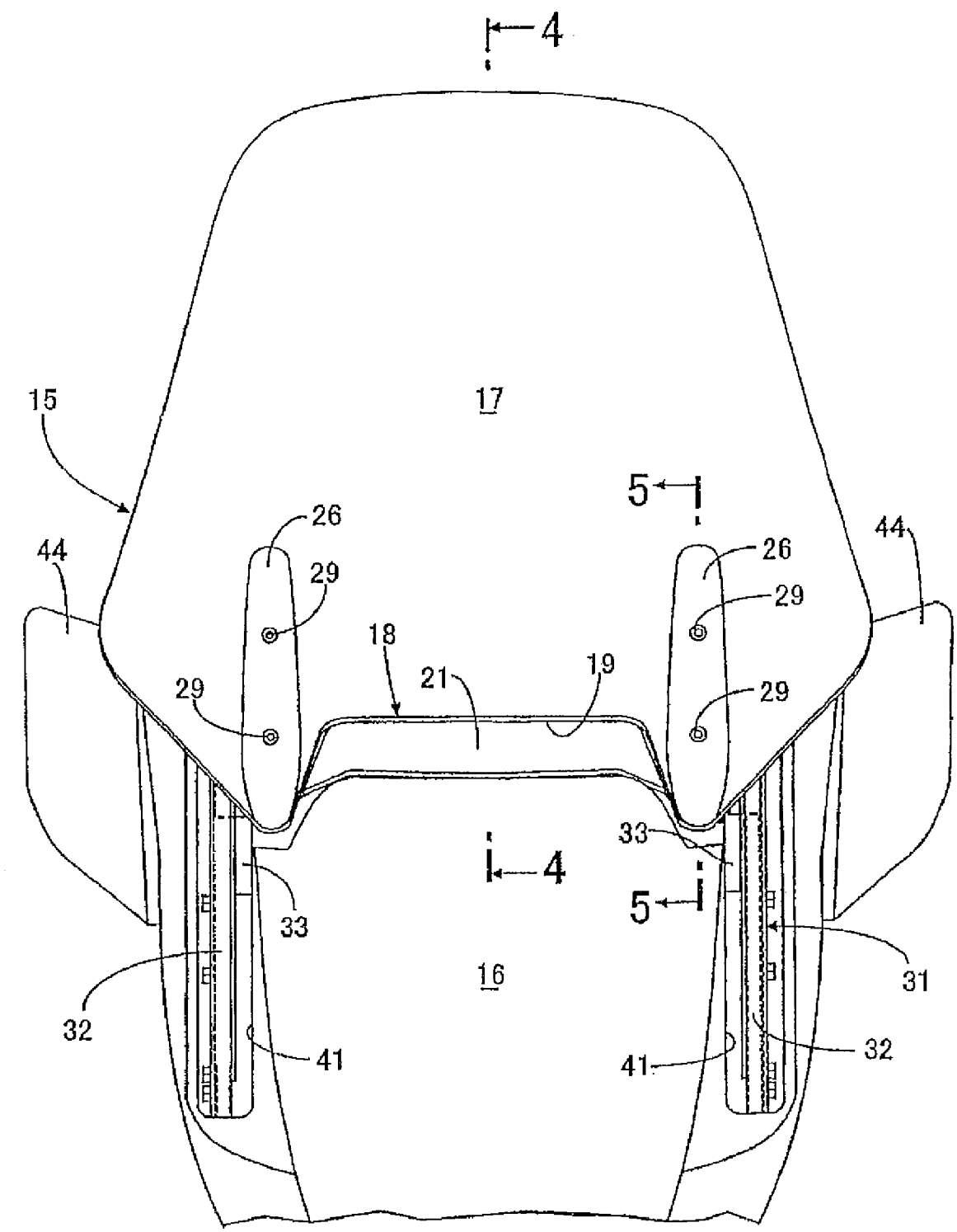
FIG. 2 is a view taken along arrow 2 of FIG. 1, showing the condition where a windscreen is present at an uppermost end in accordance with an embodiment of the present invention.
Figure 3:
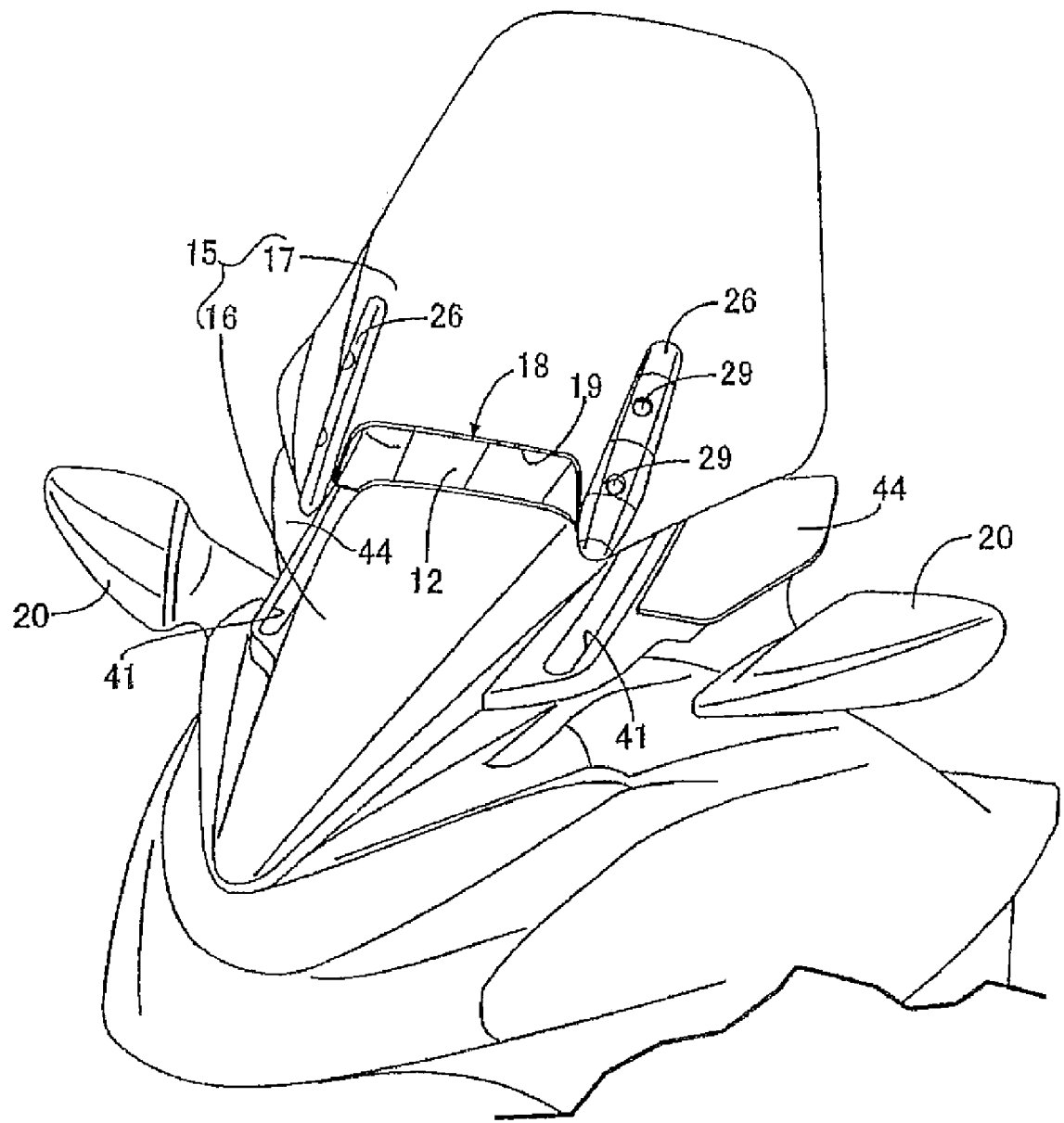
FIG. 3 is a perspective view from the skew front side of a windshield device in the condition where the windscreen is present at the uppermost end in accordance with an embodiment of the present invention.
Figure 4:
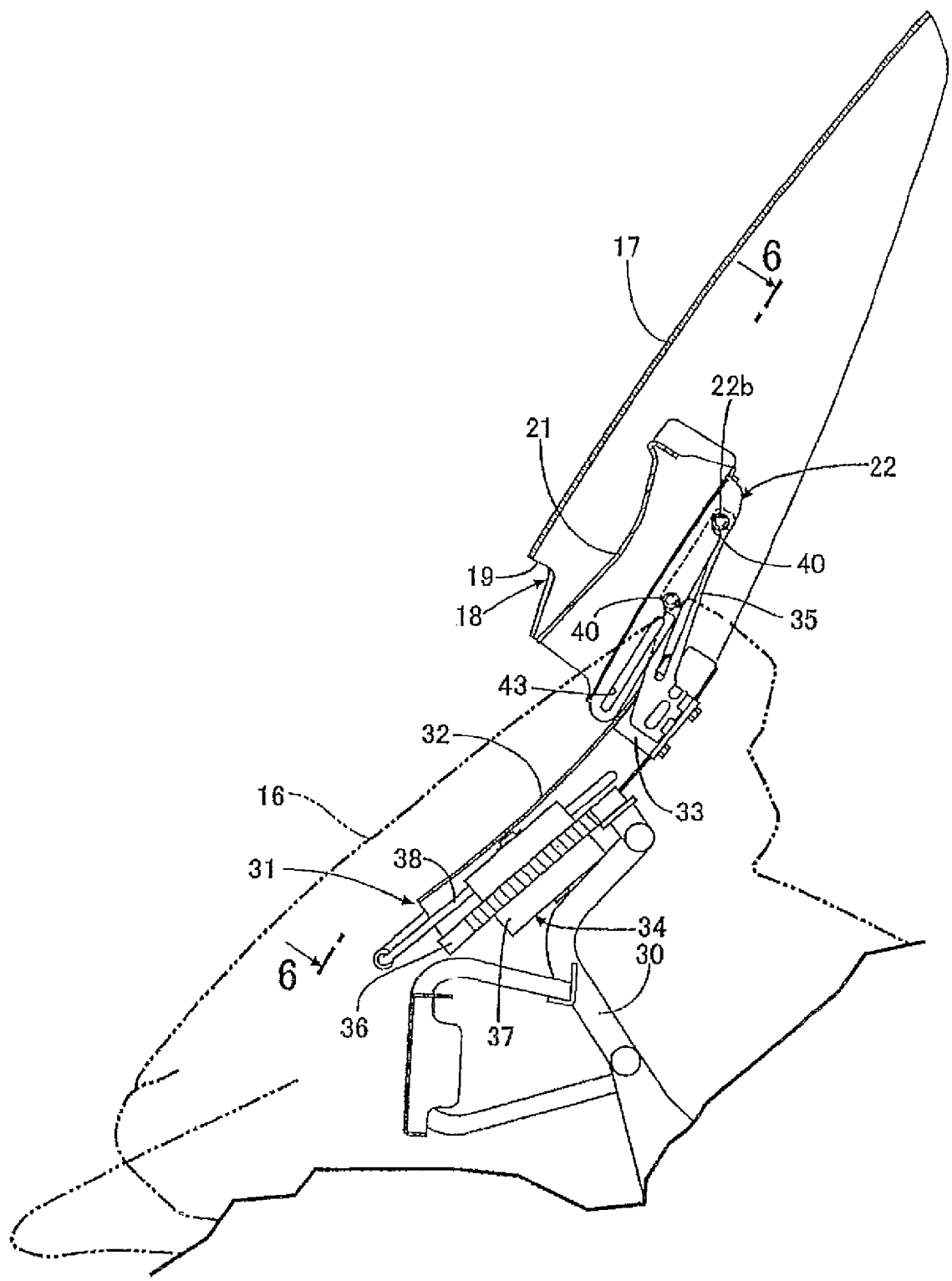
FIG. 4 is a sectional view taken along line 4-4 of FIG. 2 in accordance with an embodiment of the present invention.
Figure 5:
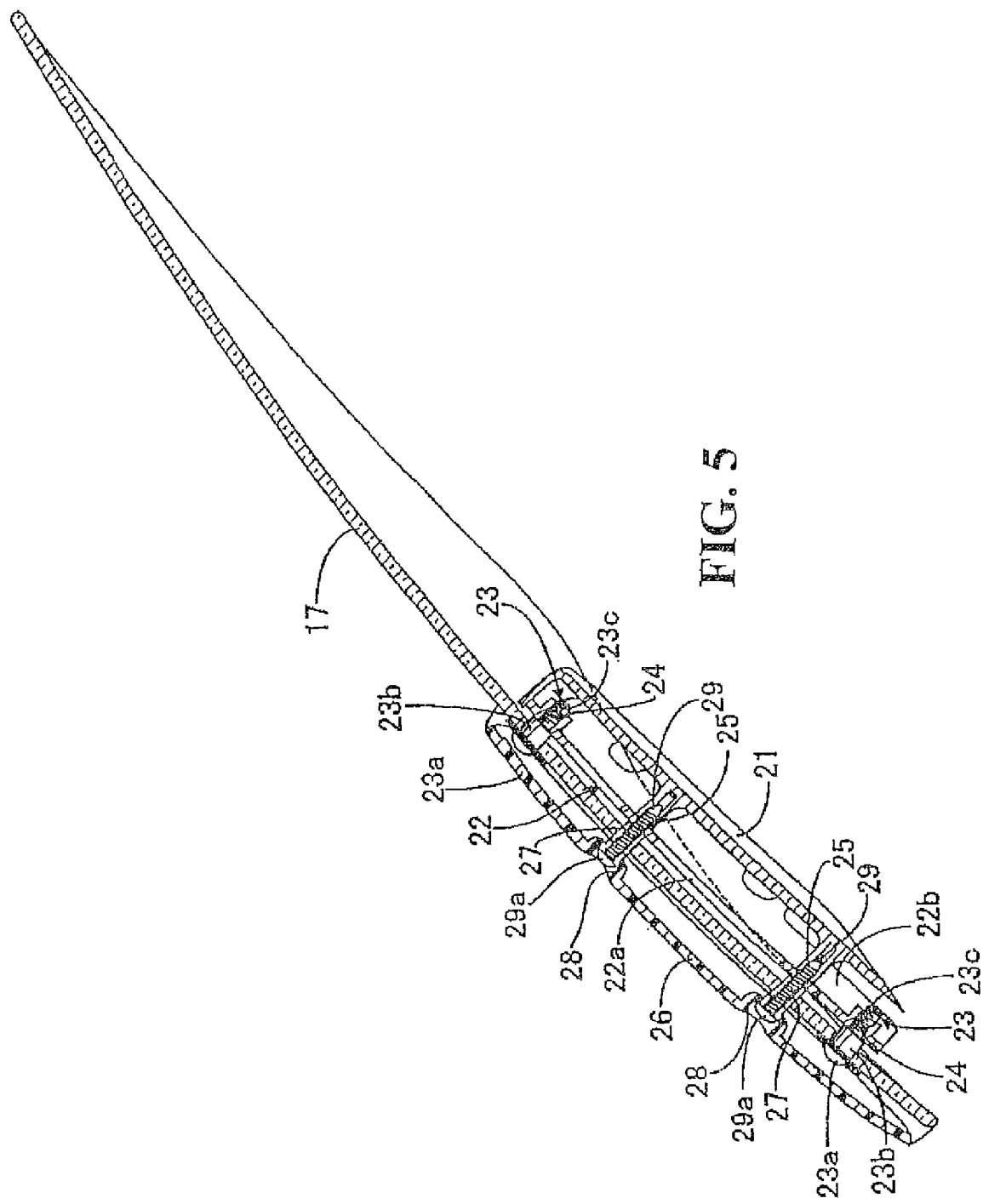
FIG. 5 is a sectional view taken along line 5-5 of FIG. 2 in accordance with an embodiment of the present invention.
Figure 6:
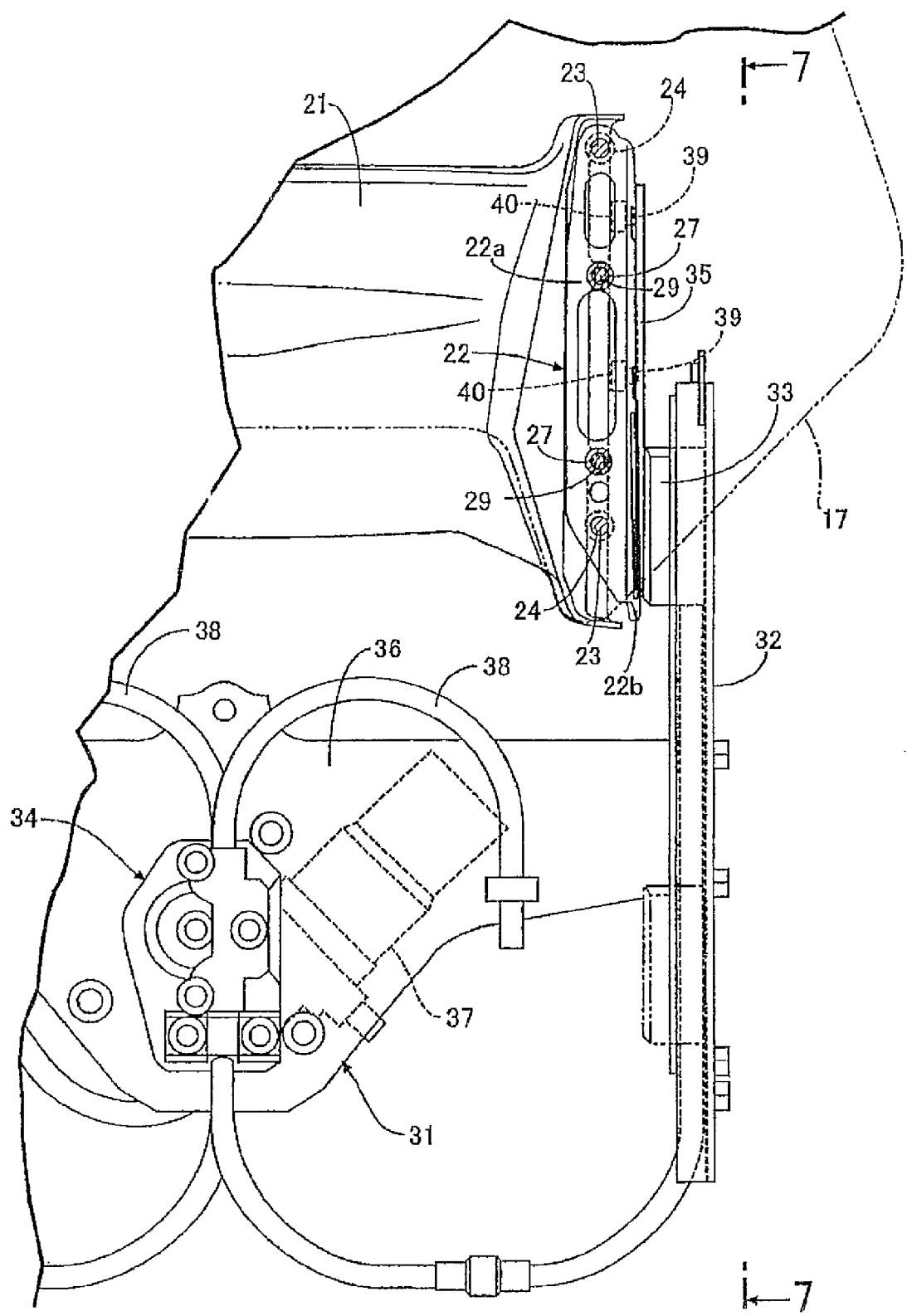
FIG. 6 is a view taken along arrows of line 6-6 of FIG. 4, showing a part of a screen driving unit in accordance with an embodiment of the present invention.
Figure 7:
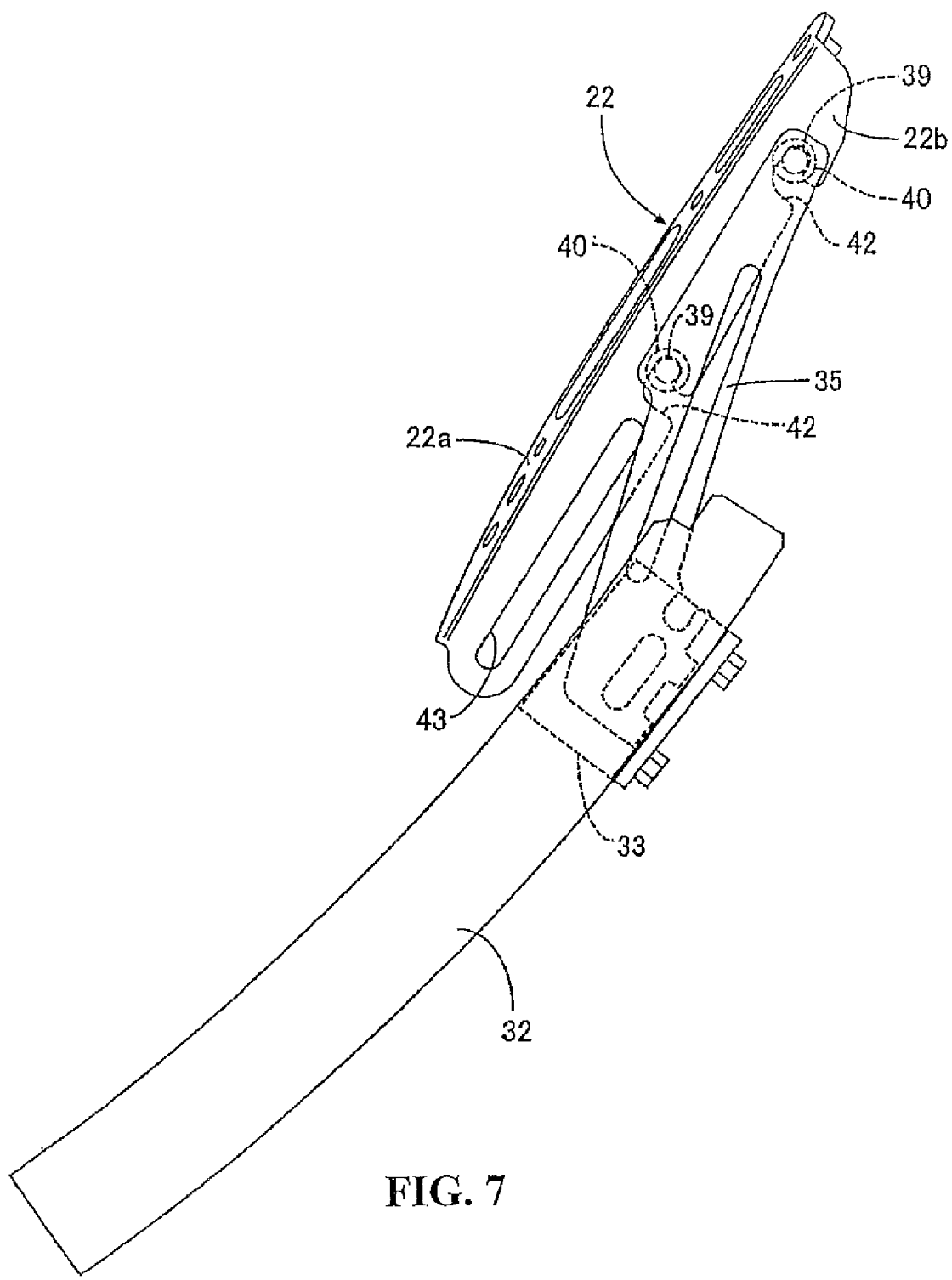
FIG. 7 is a view taken along arrows 7 of FIG. 6 in accordance with an embodiment of the present invention.
Figure 8:
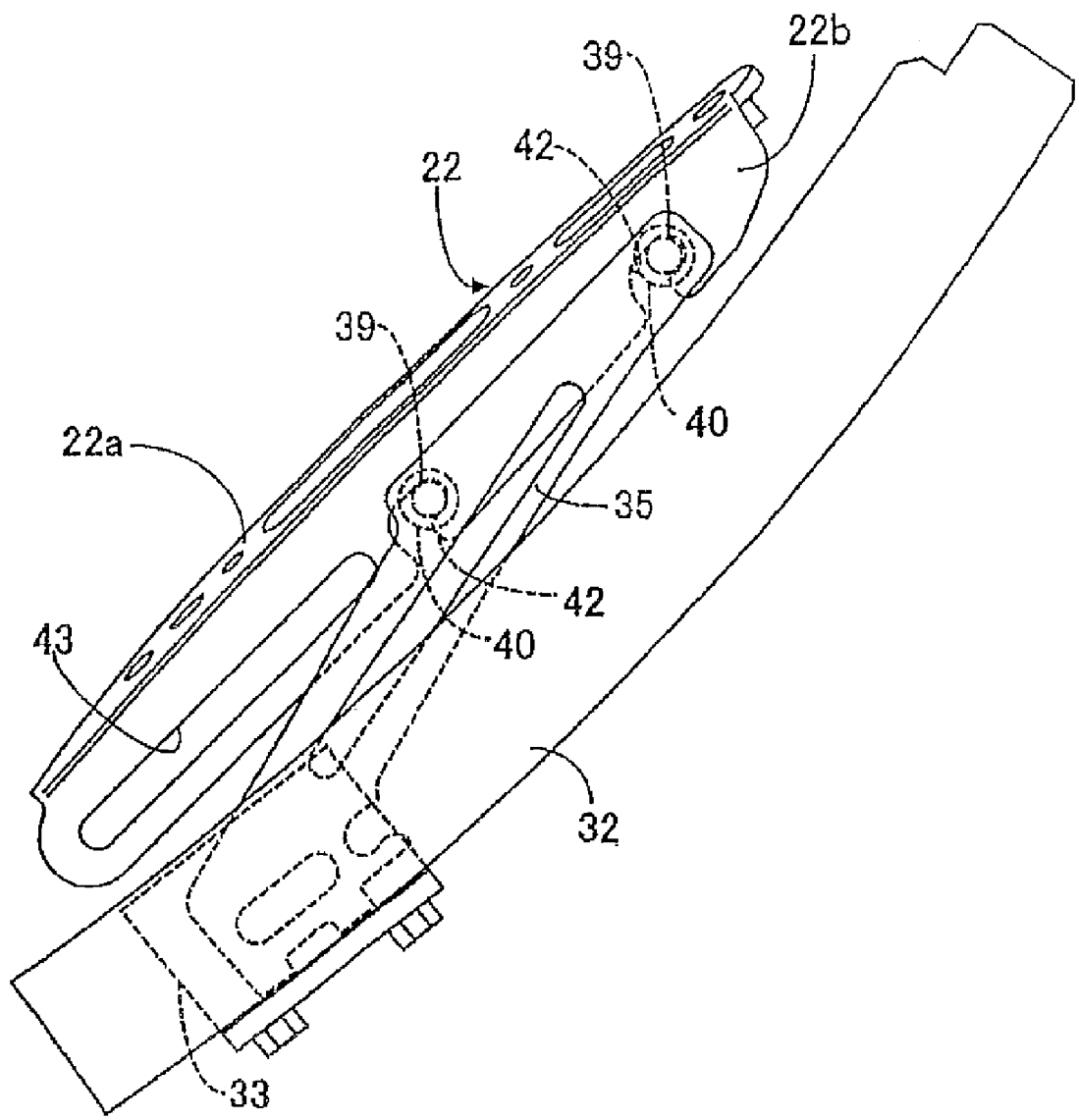
FIG. 8 is a view corresponding to FIG. 7, showing the condition where the windscreen is moved to a lowermost end in accordance with an embodiment of the present invention.
Figure 9:
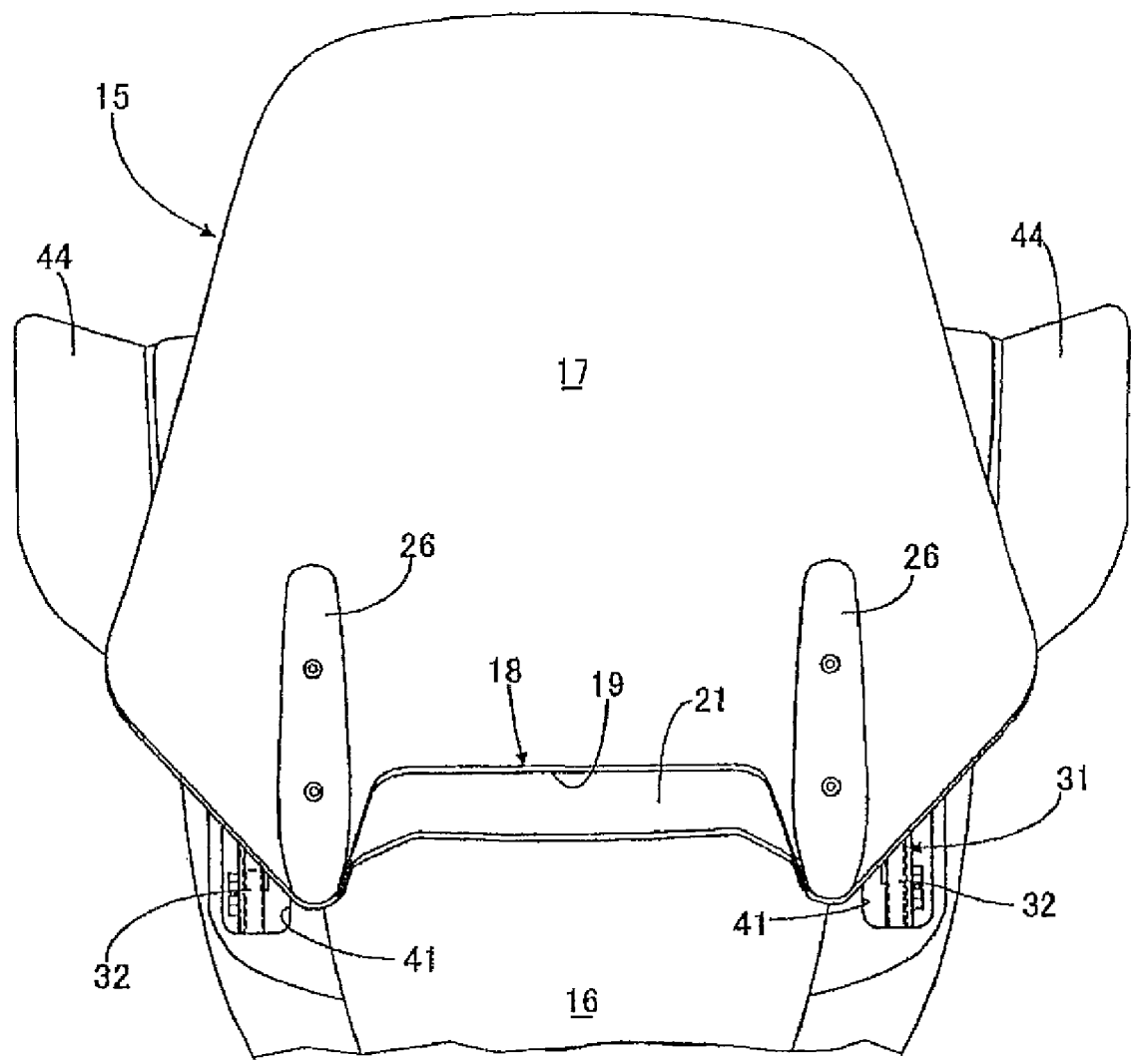
FIG. 9 is a front view corresponding to FIG. 2, showing the condition where the windscreen is present at the lowermost end in accordance with an embodiment of the present invention.
Figure 10:
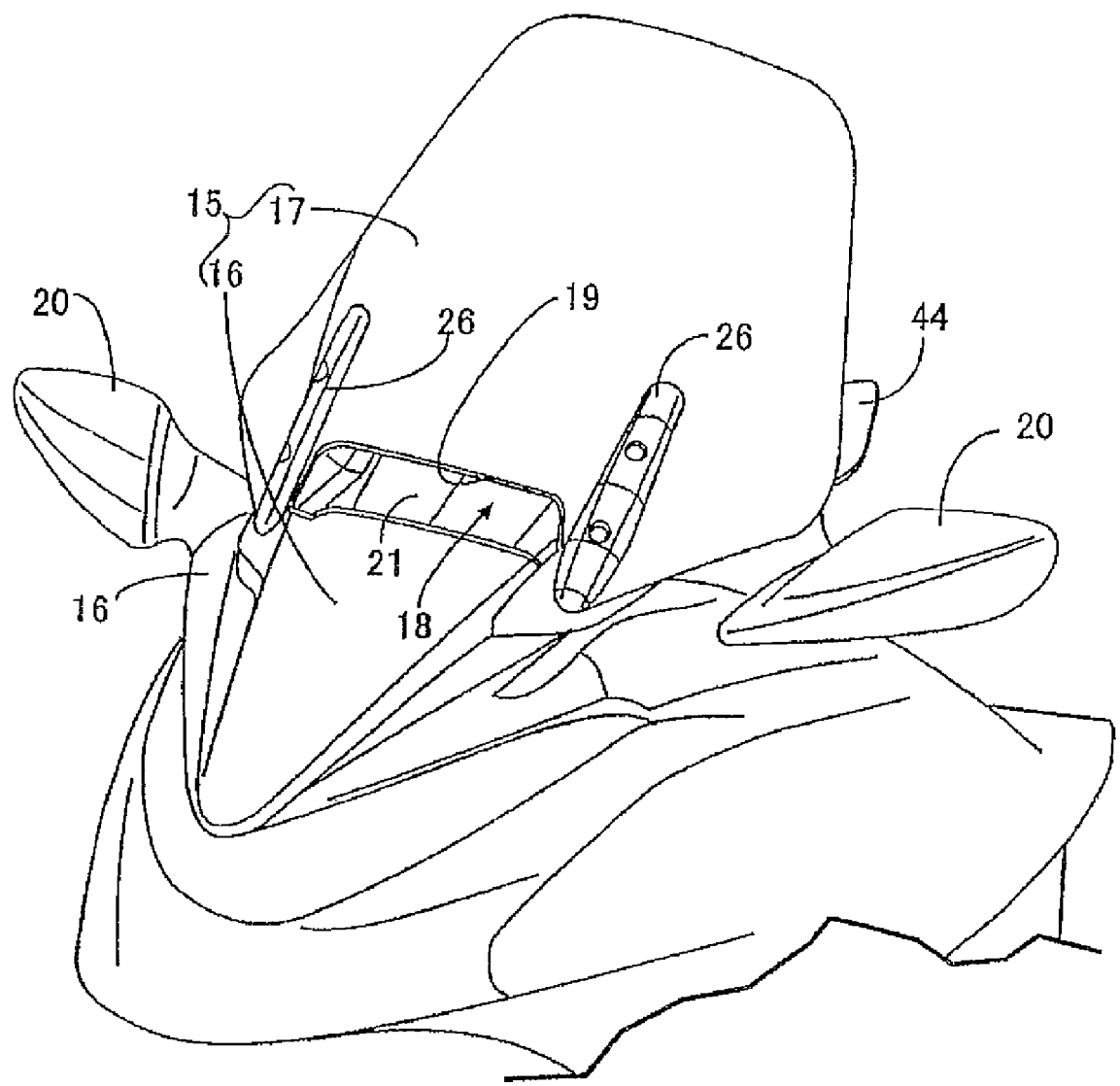
FIG. 10 is a perspective view corresponding to FIG. 3, showing the condition where the windscreen is present at the lowermost end in accordance with an embodiment of the present invention.
Figure 11:
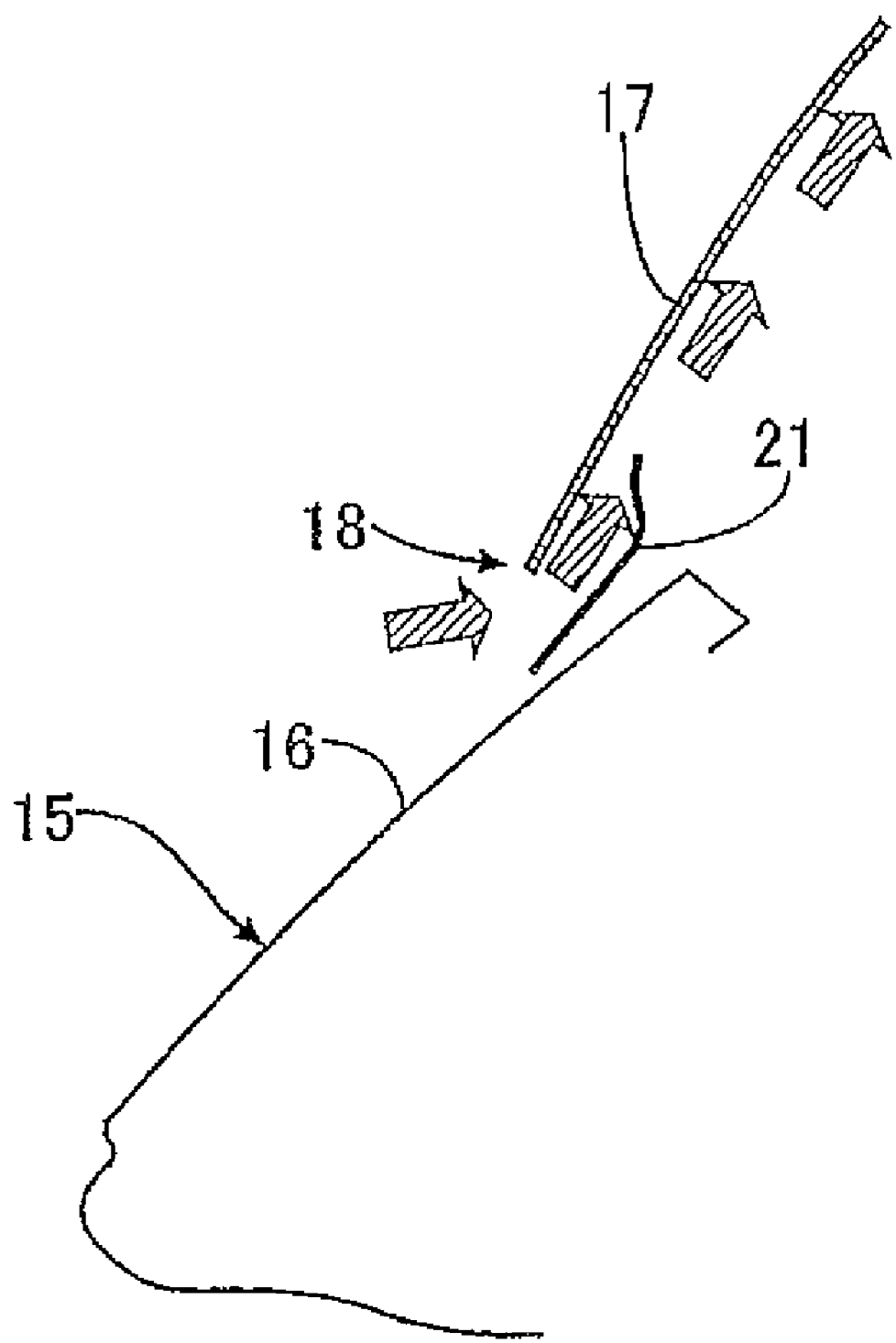
FIG. 11 is a schematic side view showing the flow of air affected by a windshield device in accordance with an embodiment of the present invention.

FIGS. 1 to 11 show an embodiment of the present invention, in which FIG. 1 is a front part side view of a motorcycle; FIG. 2 is a view taken along arrow 2 of FIG. 1, showing the condition where a windscreen is present at an uppermost end; FIG. 3 is a perspective view from the skew front side of a windshield device in the condition where the windscreen is present at the uppermost end; FIG. 4 is a sectional view taken along line 4-4 of FIG. 2; FIG. 5 is a sectional view taken along line 5-5 of FIG. 2; FIG. 6 is a view taken along arrows of line 6-6 of FIG. 4, showing a part of a screen driving unit; FIG. 7 is a view taken along arrows 7 of FIG. 6; FIG. 8 is a view corresponding to FIG. 7, showing the condition where the windscreen is moved to a lowermost end; FIG. 9 is a front view corresponding to FIG. 2, showing the condition where the windscreen is present at the lowermost end; FIG. 10 is a perspective view corresponding to FIG. 3, showing the condition where the windscreen is present at the lowermost end; and FIG. 11 is a schematic side view showing the flow of air effected by a windshield device.

First, in FIGS. 1-3, a motorcycle has a windshield device 15 at a front part thereof. The windshield device 15 includes a synthetic resin-made front cowl 16 for covering a vehicle body (not shown) at the front side, and a windscreen 17 disposed at an upper part of the front cowl 16 so as to be vertically movable. The windscreen 17 is formed from a light-transmitting material, for example, a synthetic resin. The windscreen 17 is provided at the center of a lower part thereof with a recess 19 recessed to the upper side for forming an air introducing port 18, for introduction of air from the front side, between itself and a front surface of the front cowl 16. In addition, rear-view mirror covers 20, 20 are provided on both lateral sides of the front cowl 16 so as to project to both lateral sides, and rear-view mirrors (not shown) are provided in the rear-view mirror covers 20.

Referring to FIGS. 4 and 5, an air guide 21 is firmly attached to the rear surface of the windscreen 17. The air guide 21 guides the air introduced through the air introducing port 18 to make the air flow rearwards along the rear surface of the windscreen 17. That part of the front cowl 16, which is below the air guide 21, also functions as a meter visor for covering, on the front side, meters (not shown) arranged on the rear side of the front cowl 16. The windscreen 17, the air guide 21, and at least that part (in this embodiment, the whole part) of the front cowl 16 which is below the windscreen 17 are formed to be inclined rearwardly upwards.

The air guide 21 is so formed that a central part thereof has a recess, and a lower part of the air guide 21 is disposed to be in front of the recess 19 at the lower central part of the windscreen 17. Moreover, brackets 22 are firmly attached by a plurality of pairs of screw members 23, 23 to the rear surface of the windscreen 17 at parts corresponding to both sides of the air guide 21 along the width direction of the vehicle body.

Referring to FIG. 6, the bracket 22 is formed to be roughly L-shaped in the cross section, while integrally having an opposite plate part 22a opposed to the rear surface of the windscreen 17, and a side plate part 22b which is substantially perpendicularly connected to the outer side of the opposite plate part 22a along the width direction of the vehicle body and which extends to the opposite side of the windscreen 17. In addition, the screw member 23 has, in a coaxially connected state, an enlarged diameter head part 23a in contact with and engaged with the front surface of the front cowl 16, a penetrating shaft part 23b connected at its one end to the enlarged diameter head part 23a and penetrating the front cowl 16, and a screw shaft part 23c formed to be smaller than the penetrating shaft part 23b in diameter and connected to the other end of the penetrating shaft part 23b. The length of the penetrating shaft part 23b is set to be larger than the thickness of the windscreen 17. On the other hand, the opposite plate part 22a of the bracket 22 is provided in its upper part and its lower part with screw holes 24 for screw engagement with the screw shaft part 23c of the screw members 23. The screw shaft parts 23c are put into screw engagement with the screw holes 24 and tightened until the opposite plate part 22a of the bracket 22 comes into contact with the other ends of the penetrating shaft parts 23b, whereby the brackets 22 are firmly attached to the rear surface of the windscreen 17 so as to leave gaps between the opposite plate parts 22a thereof and the rear surface of the windscreen 17.

Both side parts of the air guide 21 along the width direction of the vehicle body are disposed at such positions that both the brackets 22 are located between themselves and the rear surface of the windscreen 17. Base ends of a pair of mounting projected parts 25, 25 having tip pairs brought into contact with the opposite plate parts 22a of the brackets 22 are provided substantially perpendicular to and integrally with both side parts of the air guide 21. The mounting projected parts 25 are formed in a tubular shape.

On the other hand, the front surface of the windscreen 17 is covered with covers 26, 26 at its pairs corresponding to both side parts of the air guide 21. The covers 26 are provided with: a pair of mounting tube parts 27, 27 which penetrate the windscreen 17 at positions corresponding to the mounting projected parts 25 at both side parts of the air guide 21 and are in contact with the front surfaces of the brackets 22 so that the opposite plate parts 22a of the brackets 22 are located between themselves and the mounting projected parts 25; and recesses 28, 28 recessed from the front surfaces so as to communicate with the mounting tube parts 27. Screw members 29, 29 penetrating the mounting tube parts 27 and the opposite plate part 22a of the bracket 22 so as to have their enlarged diameter head parts 29a accommodated in the recesses 28 are put into screw engagement with the mounting projected parts 25. The air guide 21 is firmly attached to the rear surface of the windscreen 17 so that the opposite plate parts 22a of the brackets 22 are located between itself and the windscreen 17.

Meanwhile, the windscreen 17 and the air guide 21 firmly attached to the windscreen 17 are vertically moved by a windscreen driving unit 31 supported by a stay 30, (see FIG. 4) which is provided in the vehicle body and fixedly disposed inside the front cowl 16. The windscreen driving unit 31 includes: a left-right pair of guide rails 32, 32 extending rearwardly upwards on the lower side of an upper part of the front cowl 16; a left-right pair of movable members 33, 33 movably borne respectively on the guide rails 32; an actuator 34 operative to drive the movable members 33; and connecting members 35, 35 for connection between the movable members 33 and the brackets 22.

A flat plate-like support member 36 extending in the width direction of the vehicle body is fixed to the stay 30, and the guide rails 32 are attached to both sides of the support member 36. The actuator 34 is disposed at a central part of the support member 36 while including an electric motor 37 which is capable of normal rotation and reverse rotation and is attached to the lower surface of the central pail of the support member 36. The activator 34 and both the movable members 33 are connected to each other through push-pull cables 38, 38.

Both the movable members 33 are moved upwards while being guided by the guide rails 32 as shown in FIG. 7 by the operation of the actuator 34 when the electric motor 37 is put into normal (forward) rotation, for example, and are moved downwards while being guided by the guide rails 32 as shown in FIG. 8 by the operation of the actuator 34 when the electric motor 37 is put into reverse rotation, for example.

The connecting members 35 are firmly attached to the movable members 33 at one-side ends thereof and extend upwards, and a plurality of pairs of bolts 39, 39 are firmly and perpendicularly attached to upper parts of the connecting members 35. Upper ends of the connecting members 35 are connected to side plate parts 22b of the brackets 22 by the bolts 39 and nuts 40 brought into screw engagement with the bolts 39. The front cowl 16 is provided with a pair of through-holes 41, 41 through which the front cowl 16 passes the connecting members 35. Both the through-holes 41 are formed in a slot shape so as to permit the connecting members 35 to be moved together with the movable members 33.

When the movable members 33 are present at the upper positions of the guide rails 32, the windscreen 17 and the air guide 21 are present at the upper positions of an upper part of the front cowl 16, as indicated by solid lines in FIG. 1 and shown in FIGS. 2 and 3. When the movable members 33 are moved to lower positions of the guide rails 32, the windscreen 17 and the air guide 21 are moved to lower positions of the upper pail of the front cowl 16, as indicated by dotted lines in FIG. 1 and shown in FIGS. 9 and 10.

Moreover, the side plate part 22b of the bracket 22 is provided in its upper part with a pair of mounting recesses 42, 42 substantially L-shaped and opened to the lower side so that the bolts 39 for fixing the connecting member 35 to the side plate part 22b are passed therethrough, and the side plate part 22b is provided in its lower part with a slot 43 for permitting the bolts 39 to pass through both end parts thereof. By selecting either of the mounting recesses 42 and the slot 43, the position of connection of the connecting member 35 to the bracket 22 can be selected.

On both sides of the front cowl 16 along the width direction of the vehicle body, sub-screens 44, 44 are provided on the lower side of the windscreen 17. The sub-screens 44 can guide the air present on both lateral lower sides of the windscreen 17 so as to make the air flow to the outside of the vehicle body when the windscreen 17 is moved to the upper side.

Moreover, the sub-screens 44 may be fixedly provided on both sides of the front cowl 16, or may be disposed on both sides of the front cowl 16 so as to be moved according to the movement of the windscreen 17 and the air guide 21.

Now, the operation of this embodiment will be described as follows. The air introducing port 18 for introducing air from the front side is formed between a lower part of the windscreen 17 and the front surface of the front cowl 16, and the air guide 21 for guiding the air introduced through the air introducing port 18 to flow rearwards along the rear surface of the windscreen 17 as indicated by arrows in FIG. 11 is provided in the state of being fixed to the rear surface of the windscreen 17. Therefore, even when the position of the air introducing port 18 is changed due to a movement of the windscreen 17, the flow of the air introduced via the air introducing port 18 can be controlled so that the air can efficiently be made to flow along the rear surface of the windscreen 17.

In addition, the windscreen 17, the air guide 21, and at least that part (in this embodiment, the whole part) of the front cowl 16 which is below the windscreen 17 are formed to be inclined rearwardly upwards. Therefore, even when the windscreen 17 is vertically moved, the air coming from the front side can be efficiently introduced into the air introducing port 18.

Furthermore, on both sides of the front cowl 16 along the width direction of the vehicle body, the sub-screens 44 are located at the lower side of the screen 17 for guiding the air present on both lateral lower sides of the windscreen 17 so as to make the air flow to the outside of the vehicle body when the windscreen 17 is moved to the upper side. Therefore, the air present at the lower side of the windscreen 17 and on both sides of the front cowl 16 can be efficiently made to flow rearwards, regardless of vertical movements of the windscreen 17. Particularly, when the windscreen 17 is moved to the uppermost position, the air present on both sides of the front cowl 16 can be efficiently made to flow rearwards by the sub-screens 44.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A windshield device for a motorcycle, comprising
a front cowl located at a front side of the vehicle body to cover a vehicle body;
a windscreen disposed at an upper part of the front cowl so as to be vertically movable;
an air introducing port for introduction of air from the front side being formed between a lower end of the windscreen and a front surface of the front cowl; and
an air guide for guiding the air introduced through the air introducing port to flow rearwards along a rear surface of the windscreen, wherein the air guide is firmly attached to the rear surface of the windscreen,
wherein the air introducing port has a front opening facing the front side of the vehicle body, and the windscreen and the air guide in combination fully surround and define the front opening of the air introducing port.

2. The windshield device as set forth in claim 1, wherein the windscreen, the air guide, and at least a part of the front cowl below the windscreen are inclined rearwardly upwards.

3. The windshield device as set forth in claim 2, further comprising a plurality of sub-screens for guiding the air at both lateral lower sides of the windscreen to make the air flow to outside of the vehicle body when the windscreen is moved upwards, wherein the sub-screens are provided respectively on both sides of the front cowl along a width direction of the vehicle body, and located below the windscreen.

4. The windshield device as set forth in claim 1, further comprising sub-screens for guiding the air at both lateral lower sides of the windscreen to make the air flow to outside of the vehicle body when the windscreen is moved upwards, wherein the sub-screens are provided respectively on both sides of the front cowl along a width direction of the vehicle body and located below the windscreen.

5. A windshield device for a motorcycle, comprising
a front cowl located at a front side of the vehicle body to cover a vehicle body;
a windscreen disposed at an upper part of the front cowl so as to be vertically movable;
an air introducing port for introduction of air from the front side being formed between a lower end of the windscreen and a front surface of the front cowl; and
an air guide for guiding the air introduced through the air introducing port to flow rearwards along a rear surface of the windscreen, wherein the air guide is firmly attached to the rear surface of the windscreen,
wherein the air guide is located above the front surface of the front cowl and below the lower end of the windscreen.

6. A windshield device for a motorcycle, comprising
a front cowl located at a front side of the vehicle body to cover a vehicle body;
a windscreen disposed at an upper part of the front cowl so as to be vertically movable;
an air introducing port for introduction of air from the front side being formed between a lower end of the windscreen and a front surface of the front cowl; and
an air guide for guiding the air introduced through the air introducing port to flow rearwards along a rear surface of the windscreen, wherein the air guide is firmly attached to the rear surface of the windscreen,
wherein a lower end of the air guide protrudes below and in front of the lower end the windscreen.

7. The windshield device as set forth in claim 1, wherein the air guide has a recess at a central portion thereof.

8. A windshield device for a motorcycle, comprising
a front cowl located at a front side of the vehicle body;
a windscreen disposed at an upper part of the front cowl and vertically movable;
an air introducing port between a lower part of the windscreen and a front surface of the front cowl for introduction therethrough; and
an air guide fixedly attached to a rear surface of the windscreen for guiding the air introduced through the air introducing port rearwards along the rear surface of the windscreen,
wherein the air introducing port has a front opening facing the front side of the vehicle body, and the windscreen and the air guide in combination fully surround and define the front opening of the air introducing port.

9. The windshield device as set forth in claim 8, wherein the windscreen, the air guide, and at least a part of the front cowl below the windscreen are inclined rearwardly upwards.

10. The windshield device as set forth in claim 8, further comprising a plurality of sub-screens for guiding the air at both lateral lower sides of the windscreen to make the air flow to outside of the vehicle body when the windscreen is moved upwards, wherein the sub-screens are provided respectively on both sides of the front cowl along a width direction of the vehicle body, and located below the windscreen.

11. A windshield device for a motorcycle, comprising
a front cowl located at a front side of the vehicle body;
a windscreen disposed at an upper part of the front cowl and vertically movable;
an air introducing port between a lower part of the windscreen and a front surface of the front cowl for introduction therethrough; and
an air guide fixedly attached to a rear surface of the windscreen for guiding the air introduced through the air introducing port rearwards along the rear surface of the windscreen,
wherein the air guide is located above the front surface of the front cowl and below the lower end of the windscreen.

12. A windshield device for a motorcycle, comprising
a front cowl located at a front side of the vehicle body;
a windscreen disposed at an upper part of the front cowl and vertically movable;
an air introducing port between a lower part of the windscreen and a front surface of the front cowl for introduction therethrough; and
an air guide fixedly attached to a rear surface of the windscreen for guiding the air introduced through the air introducing port rearwards along the rear surface of the windscreen,
wherein a lower end of the air guide protrudes below and in front of the lower end the windscreen.

13. The windshield device as set forth in claim 8, wherein the air guide has a recess at a central portion thereof.

14. The windshield device as set forth in claim 1, wherein the rear surface of the windscreen and a front surface of the air guide form a circumferential surface fully surrounding the front opening of the air introducing port.

15. The windshield device as set forth in claim 8, wherein the rear surface of the windscreen and a front surface of the air guide form a circumferential surface fully surrounding the front opening of the air introducing port.

* * * * *